Figure 1:
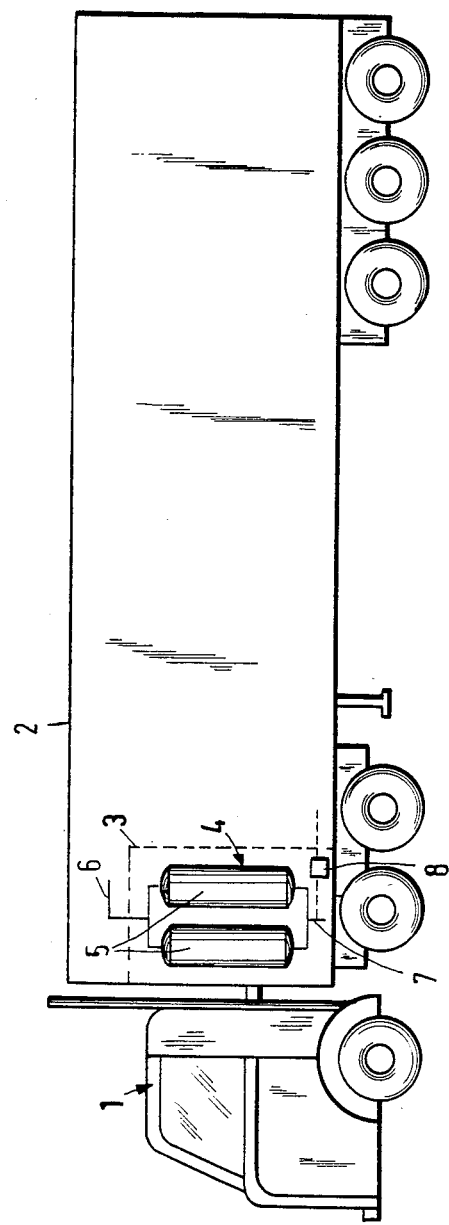

United States Patent [19]

Knoblauch et al.

[11] Patent Number: 4,566,282

[45] Date of Patent: Jan. 28, 1986

[54] METHOD AND APPARATUS FOR INERTING TRANSPORT CONTAINERS

[75] Inventors: Karl Knoblauch, Essen; Burkhard Harder, Oberhausen-Dellwig; Heinrich Heimbach, Essen-Heidhausen, all of Fed. Rep. of Germany; Charles F. Cosentino, Wheaton, Ill.

[73] Assignees: Bergwerksverband GmbH, Essen, Fed. Rep. of Germany; Nitrotec Corporation, New York, N.Y.

[21] Appl. No.: 591,401

[22] Filed: Mar. 19, 1984

[30] Foreign Application Priority Data

Mar. 19, 1983 [DE] Fed. Rep. of Germany ....... 3310012

[51] Int. Cl.[4] ............................................. F17C 11/00
[52] U.S. Cl. .......................................... 62/48; 62/62; 62/78; 62/239; 426/419
[58] Field of Search ................. 62/62, 78, 48, 239; 426/419

[56] References Cited

U.S. PATENT DOCUMENTS 3,962,477 6/1976 Dixon ................................. 426/419
4,178,987 12/1979 Bowman et al. ..................... 62/48

OTHER PUBLICATIONS

Juntgen, H. et al: "Carbon Molecular Sieves: Production from Coal Application in Gas Separation", Fuel, 1981, vol. 60, Sep., pp. 817–822.

Primary Examiner—Ronald C. Capossela
Attorney, Agent, or Firm—Martin A. Farber

[57] ABSTRACT

A simple, inexpensive method of inerting transport containers, particularly for goods which easily spoil in the air, such as foodstuffs, plants and flowers, by a gas which contains nitrogen and a predetermined concentration of up to about 5 vol. % oxygen is made possible in the manner that air is conducted, in a cyclic pressure-change adsorption process, through a layer of adsorbent in which the oxygen in the air is adsorbed on the adsorbent in each case during an adsorption step at a pressure above atmospheric pressure and a nitrogen-rich gaseous mixture still containing oxygen which discharges at the end of the layer of adsorbent is conducted into the transport container to be inerted, and the adsorbed oxygen of the air is desorbed in each case during the desorption steps by reducing the pressure of the adsorbent and, finally, the next adsorption step is started, a multiple of the predetermined quantity of air necessary to maintain the desired oxygen content flowing in the adsorption steps through the layer of adsorbent in a first inerting phase and one time said the quantity of air flowing through it in a second inerting phase.

9 Claims, 2 Drawing Figures

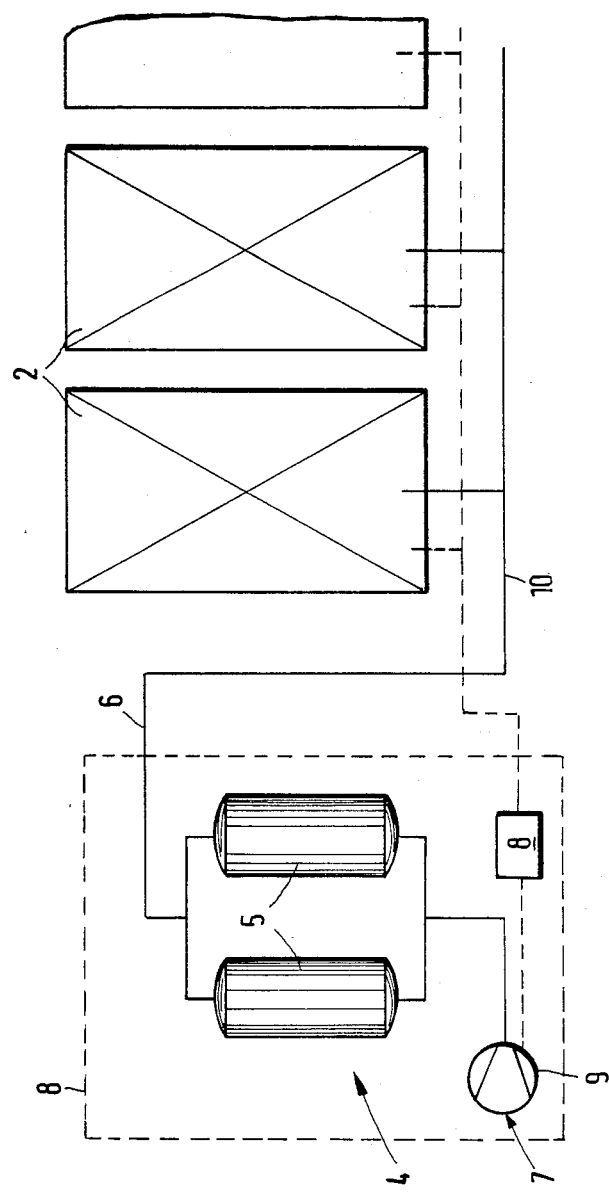

METHOD AND APPARATUS FOR INERTING TRANSPORT CONTAINERS

The present invention refers to a method of inerting transport containers with a gas which contains nitrogen and a predetermined concentration of up to abt. 5 vol. % oxygen, as well as an apparatus for the carrying out of this method.

Transport containers are inerted in order to protect the goods stored therein from the injurious defects of the oxygen in the air. In many cases it is, however, necessary to maintain a very specific residual concentration of nitrogen within the container and to keep this concentration constant for long periods of time. In particular, for the transportation of easily spoiled foods, vegetables and flowers in large transport containers for truck, railway and ship transportation, as well as possibly also for airplane transportation, the cooling of the foodstuffs during transportation, as has been customary for a long time, as well as verification of the circulation of the air and of the relative humidity have proven insufficient, particularly in the case of high-quality foods. Since, however, it has been known for a long time that in the case of easily spoiled foods, the respiratory activity of the foods, plants and flowers and the growth of bacteria are reduced in an atmosphere of reduced oxygen content, it has already been attempted to inert the containers with nitrogen during the time of the transport. In this connection, it was necessary to solve the problem that "living" products require a given minimum oxygen concentration in the atmosphere surrounding them, which concentration is, as a rule, less than 5 but mostly more than 0.1%, in order not to be chemically modified. Furthermore, the presence of significant carbon-dioxide concentrations must absolutely be avoided. Deviations from the optimum oxygen concentration either lead to destruction of the foodstuffs or wilting of the flowers and plants, or else reduce their preservation during transportation.

In order to solve this problem it has been proposed to connect the transport container which is to be inerted with a liquefied-gas tank containing pure nitrogen and to introduce the nitrogen from the tank, as well as a controlled quantity of oxygen from the atmosphere, into the transport container in order to make it inert, or else, in order to reduce the control expense, to store a mixture of oxygen and nitrogen already containing the required amount of oxygen in the tank (U.S. Pat. No. 3,962,477). This manner of inerting the transport container, however, has significant disadvantages:

First of all, the liquefied-gas tank must be cooled and it therefore must consist of a Dewar vessel; for the cooling, liquefied gas is continuously evaporated so that the losses of liquefied gas range up to 80%;

secondly, the use of liquefied-gas tanks for transport containers requires a ramified network of refilling stations since the storage capacity of such tanks is very limited, and thirdly, the preparation of a nitrogen-rich gaseous mixture having a predetermined concentration of oxygen is extremely costly in view of separation processes in the liquefied-gas tank as well as control measures upon the adding of a dosaged amount of atmospheric oxygen to pure nitrogen.

The object of the present invention is, therefore, to provide a method and apparatus of the aforementioned type by which the inerting of a transport container with a gas containing nitrogen and a predetermined concentration of oxygen is possible in a simple and inexpensive manner.

This object is achieved with respect to a method in the manner that, within a cyclic pressure-change adsorption process, air is conducted, in each case during the adsorption steps and at a pressure above atmospheric pressure, through a layer of adsorbent in which the oxygen in the air is adsorbed on the adsorbent and a nitrogen-rich gaseous mixture which still contains oxygen which discharges at the end of the layer of adsorbent is conducted into the transport container to be inerted and in each case during the desorption steps the absorbed atmospheric oxygen is desorbed from the adsorbent by reduction of the pressure and finally the next adsorption step is started, a multiple of the predetermined amount of air required to maintain the desired oxygen concentration flowing in a first inerting phase through the layer of adsorbent and one times this amount of air flowing through it during the second inerting phase. The invention thus is based on the fundamental concept, in the known inerting of transport containers with a gas which contains nitrogen and a predetermined concentration of oxygen, of making the nitrogen available in each case as required, independently of liquefied-gas tanks and filling stations for such tanks, by means of a known cyclic pressure-change adsorption process such as has been described, for instance, in the journal "Fuel," 1981, pages 817–822. In this way, independence from a supply of nitrogen is obtained and energy losses due to the evaporation of liquefied nitrogen are avoided. In accordance with the invention, the oxygen concentration necessary in the inerting nitrogen is assured in a very elegant and easily reproducible manner in that the quantity of air fed during an adsorption step through the layer of adsorbent is adjusted in accordance with the oxygen concentration of the product gas. This can be done either by changing the duration of the adsorption step with constant velocity of flow of the air, or else, while maintaining the duration of the adsorption step constant, changing the velocity of flow of the air through the layer of adsorbent. In accordance with the invention, therefore, one employs a kind of ordinary pressure-change adsorption process which was previously considered detrimental and which consists therein that a pure product gas is obtained only when it is seen to it, as a result of suitable conditions of flow and pressure, that all other gases from the product gas have been removed adsorptively from the initial mixture by the adsorbent. In contradistinction to this, the invention proceeds along an entirely different path in that it proposes operating the pressure-change adsorption process intentionally in such a manner that a predetermined quantity of the gas component which is otherwise to be removed from the initial mixture is present in the product gas. Of course, it is not necessary to keep the nitrogen concentration constant in the product gas during the individual adsorption steps but, rather, it will as a rule be sufficient to adjust the amount of air flowing through the layer of adsorbent in such a manner during the adsorption phase that the average concentration of the product gas discharging during an adsorption step has a constant average value. This is possible since the adsorption steps are always relatively short, so that rapid equalization of concentration can take place.

The inerting of a transport container is preferably effected by displacing the gaseous atmosphere originally present in the transport container through leakage points or special vent openings in the transport container. Particularly upon the transportation of foodstuffs which spoil easily, such as field produce, which experiences a loss of moisture very rapidly after picking, a particularly rapid inerting of the transport container is necessary; this is assured in the manner that, in accordance with the invention, the inerting takes place in two phases, a multiple of the amount of air necessary to maintain the desired nitrogen concentration flowing through the layer of adsorbent during the first inerting phase in the individual adsorption steps. For this purpose, in case of constant duration of the adsorption step, preferably about twice as much air is conducted through the layer of adsorbent as during the second inerting phase in which the inerting gas is adjusted to the oxygen concentration finally required. The increased passage of air through the layer of adsorbent during the first inerting phase leads to a higher oxygen concentration in the inerting gas, so that the transport container is, first of all, inerted with very large amounts of air per unit of time to an oxygen concentration which lies between the oxygen concentration of the surrounding atmospheric air and the final concentration desired. At the latest when this oxygen concentration has been reached, the pressure-change adsorption system is switched to a lower rate of flow of air so that after the initial, rapid inerting, the final value of the oxygen concentration is now reached correspondingly more slowly. The inerting is, therefore, accelerated without a large pressure-change adsorption plant being necessary for this. Of course, the inerting can also be effected in an even larger number of phases or even continuously.

The independence of the method of the invention from a supply of nitrogen in liquid tanks makes itself felt, in particular, upon the inerting of transport containers which are filled with foods, plants and flowers which easily spoil, since with this process only a source of energy for an air compressor need be provided.

The concentration of oxygen in the transport container is particularly well-adapted to control the pressure-change adsorption process with respect to maintaining the desired oxygen concentration, by means of the quantity of air flow.

The invention is reduced to practice with respect to an apparatus for the carrying out of the method described above, by a transport container to be inerted to a residual oxygen content of up to 5 vol. %, a cyclically operating pressure-change adsorption unit having at least one adsorber filled with an adsorbent for oxygen, a conduit which can connect the transport container to the adsorber for a nitrogen-rich gaseous mixture containing a predetermined concentration of oxygen, and a control unit which regulates the quantity of air flowing through the adsorber during the adsorption steps in a manner corresponding to the oxygen concentration desired in the inerting phases which are passed through one after the other. Such an apparatus recommends itself, in particular, in combination with vehicles for the transportation of transport containers to be inerted, such as ships, trucks and railway cars, in which the transportation vehicle is equipped with the pressure-change absorption plant and a distribution system via which the transport containers loaded on the vehicle can be connected to the pressure-change adsorption plant.

Upon the transportation of, in particular, foods, plants and flowers which easily spoil in transport containers which cannot be connected for a lengthy period of time to a central pressure-change adsorption plant of a vehicle or a storage depot, it is advisable to equip each container with its own pressure-change adsorption plant and to arrange the latter in an inwardly directed depression in a wall of the container. In this way, the transportation of the containers is not interfered with by the pressure-change adsorption plant and, in particular, there is obtained a simple possibility of combination with a cooling unit for the contents of the container which may already be present on the container.

The invention will be described in further detail below with reference to an illustrative embodiment, shown in further detail in the drawing, in which:

FIG. 1 is a diagram of a transport vehicle with a container having a pressure-change adsorption plant for the inerting of the container, and FIG. 2 is a diagram showing several containers and one pressure-change adsorption unit.

FIG. 1 shows a tractor truck 1 for the transportation of containers 2. The container is provided with an inwardly directed depression 3 in a wall of the container. Within this depression, an independent pressure-change adsorption plant 4 consisting of a diesel tank, a diesel compressor—neither of which is individually shown since they are known per se—and two adsorber vessels 5, is connected to the necessary known pipelines and valves as well as a line 6 which connects the adsorber vessel and the inside of the transport container, and an air suction line 7.

In accordance with FIG. 2, several transport containers 2 can also be connected to a single pressure-change adsorption plant 4. An independent pressure-change adsorption plant 4 consisting of a compressor 9, the two adsorber vessels 5, with the gas lines connecting them, and valves, not individually shown since customary, and a branching gas line 10, through which the inert gas produced, which has the desired oxygen concentration, flows into the transport container 2, is rigidly mounted on a frame.

The pressure-change adsorption plants 4 correspond preferably to those known from the journal "Fuel," to which reference has been had above. A control unit 8 has been merely diagrammatically indicated, the dashed connecting lines to the pressure-alternation adsorption plant 4, on the one hand, and to the transport containers 2 on the other hand indicating that these units are connected from the standpoint of control engineering. The oxygen concentration is measured in the transport containers 2, and the valves and volumetric air flows of the pressure-change adsorption plant are controlled by the unit 8.

A transport container, loaded with goods which easily spoil in air, has dimensions of 12 m in length, 3 m in height and 2.5 m in breadth, with a capacity of about 65 m$^3$ useful volume and a weight of 30 tons. The doors for loading and unloading are located on the rear side (narrow side) of the container, while on the front side there is a recess directed in the longitudinal direction of the container and having a height of 1.80 m, a depth of 1 m and a width of 2.5 m. Within this space, which is open towards the outside and is formed on top and on one side by the container wall, there is installed an independent pressure-change adsorption plant. The pressure-change plant corresponds to that described in the journal "Fuel" and consists of two transport containers of a capacity of 100 liters each; it is filled with a known charcoal molecular sieve which has the property of selectively adsorbing oxygen from the air. The pressure-change adsorption plant is provided with eight valves and connecting pipelines. It is operated within a pressure range of 8 bar to 1 bar. The cycle times are 120 seconds. Within a first half cycle, pressure equalization takes place for 1.5 seconds, pressure build-up for 3.5 seconds, and production of nitrogen with an oxygen concentration which can be adjusted via the quantity of air per unit of time for 55 seconds. In the second half of the cycle, pressure equalization between the two adsorbers again takes place for 1.5 seconds and desorption to about 1 bar for 58.5 seconds.

The air is compressed at a rate of at most 40 m$^3$ per hour to 8 bar by an air-cooled diesel compressor. The diesel compressor has a consumption of about 1.5 liters of diesel oil per hour. The size of the diesel supply is 100 liters. Via an electronic control unit which also obtains the required energy from the diesel unit, the atmosphere within the container is continuously monitored with respect to its oxygen content. If the oxygen concentration within the container increases, for instance due to the opening of the container door, to more than 5 vol. % then the electronic system adjusts the plant to produce 25 m$^3$ of inert gas per hour, which corresponds to an oxygen concentration of 4.5 % (first inerting phase). If the oxygen concentration has dropped to less than 5%, the control reduces the quantity of air and product gas and the plant now produces 8 m$^3$ of inert gas per hour, which corresponds to an oxygen content of 0.5% (second inerting phase). In another case, the control is programmed in such a manner that the plant produces 4 m$^3$ of inert gas per hour containing 0.1% oxygen during the second inerting phase. In this connection, the oxygen concentration to be established in the second inerting phase is dependent on the material to be inerted and can be noted, inter alia, from the aforementioned U.S. Pat. No. 3,962,477.

The inert gas flows in each case over a line connecting the container and the pressure-change plant into the front side of the container, flows through the container, and leaves it through vent slits present in the doors or leakage points within the container.

We claim:

1. A method of inerting transport containers comprising the steps of
    inerting transport containers with a gas which contains nitrogen and a predetermined concentration of up to about 5 vol. % oxygen in a cyclic pressure-change adsorption process comprising from time to time
        adsorbing oxygen in air on an adsorbent by conducting the air through a layer of the absorbent in which the oxygen in the air is adsorbed on the adsorbent at a pressure above atmospheric pressure and conducting a nitrogen-rich gaseous mixture still containing oxygen which discharges at the end of the layer of adsorbent into the transport container to be inerted,
        desorbing the adsorbed oxygen from the air from the adsorbent by reduction of the pressure and,
        starting a next adsorption step comprising a first inerting phase with a multiple of predetermined amount of air necessary to maintain a desired oxygen concentration flowing through the layer of adsorbent and a second inerting phase with one time said amount of air flowing through the layer of adsorbent.

2. A method according to claim 1, wherein the transport container containing goods which easily spoil in air, such as flowers, plants and foodstuffs, is inerted.

3. A method according to claim 1, wherein the inerting gas is conducted into the transport container with its pressure reduced to approximately atmospheric pressure.

4. A method according to claim 1, wherein the change from the first inerting phase to the second takes place, at the latest, when the oxygen concentration in the transport container reaches the oxygen concentration of the gaseous mixture discharging from the layer of adsorbent upon the first inerting phase.

5. A method according to claim 1, wherein
    the layer of adsorbent is traversed during the adsorption steps up to the start of the second inerting phase with approximately twice the amount of air per unit of time as traverses the adsorbent during the second inerting phase and that the duration of the adsorption steps remains at all times the same.

6. A method according to claim 1, wherein after the desired oxygen concentration has been reached in the transport container, a nitrogen-rich gaseous mixture obtained in a pressure-change adsorption process and which has the desired oxygen concentration flushes the transport container.

7. A method according to claim 1, wherein the oxygen concentration in the transport container is measured and is used to regulate the quantity of air flowing through the layer of absorbent during each adsorption step.

8. An apparatus for a transport container which is to be inerted to a residual oxygen content of up to 5 vol. %, comprising
    a cyclically operating pressure-change adsorption system with at least one adsorber vessel filled with an adsorbent for oxygen,
    means comprising a conduit connecting the transport container with the adsorber vessel for a nitrogen-rich gaseous mixture containing a predetermined oxygen concentration, and
    means comprising a control unit for, during the adsorption steps, regulating the quantity of air flowing through the adsorber in accordance with oxygen concentration desired in successively occurring inerting phases.

9. The apparatus according to claim 8, wherein
    said transport container is for containing goods which easily spoil in air, such as foodstuffs, plants and flowers and has container walls,
    one of said container walls defines an inwardly directed depression, said pressure-change adsorption system being arranged in said inwardly directed depression,
    said system being connected with atmosphere outside the container and with atmosphere within the container, and
    two layers of adsorbent filling the container,
    a compressor for air, and
    inlet and outlet valves of the adsorber vessel,
    a control and analysis unit for the inlet and outlet valves of the adsorber vessel, and wherein
    the container is inerted in two inerting phases, wherein at least adsorption is enabled with a multiple of a predetermined amount of air necessary to maintain desired oxygen concentration in a first of said two phases flowable through the layer of adsorbent and with one time said quantity of air being flowable through the layer during a second of said two phases.

* * * * *